United States Patent [19]

Witt

[11] Patent Number: 4,820,109

[45] Date of Patent: Apr. 11, 1989

[54] BIDIRECTIONAL TRANSFER MECHANISM

[75] Inventor: William F. Witt, Palo Alto, Calif.

[73] Assignee: Ampex Corporation, Redwood City, Calif.

[21] Appl. No.: 851,008

[22] Filed: Apr. 11, 1986

[51] Int. Cl.$^4$ .............................................. B65G 1/00
[52] U.S. Cl. ........................................ 414/282; 901/16
[58] Field of Search .................... 414/281, 282; 901/16

[56] References Cited

U.S. PATENT DOCUMENTS

| | | | |
|---|---|---|---|
| 3,490,616 | 1/1970 | Castaldi | 414/282 X |
| 3,502,882 | 3/1970 | Von Voros | 901/16 X |
| 3,536,194 | 10/1970 | Novak | 414/281 X |
| 3,732,742 | 5/1973 | Castaldi | 414/281 X |
| 3,779,403 | 12/1973 | Young | 414/281 X |
| 3,840,131 | 10/1974 | Castaldi | 414/281 |
| 3,934,741 | 1/1976 | Wentz | 414/282 X |
| 3,993,198 | 11/1976 | Hann | 414/281 X |
| 4,363,257 | 12/1982 | Harris et al. | 414/282 X |

Primary Examiner—Peter A. Aschenbrenner
Assistant Examiner—Thomas A. Rendos
Attorney, Agent, or Firm—Harry G. Thibault; Richard P. Lange; Stu Lowery

[57] ABSTRACT

A bidirectional transfer mechanism is provided for independent or simultaneous X-axis and Y-axis precision displacement of a mobile component, such as a video cassette pick-up unit for retrieving or returning video cassettes from a cassette library. The transfer mechanism comprises an upright column assembly supported on a machine frame for X-axis displacement and carrying the pick-up unit for Y-axis displacement. A first drive cable is connected to the upper and lower ends of the column assembly and threaded over a first set of pulleys on the machine frame, with a portion of the first cable being wrapped about a motor-driven winding drum for displacing the column assembly in the X-axis direction. A second drive cable has a portion thereof wrapped about another motor-driven winding drum and is threaded about a second set of pulleys on the column assembly and the pick-up unit, whereby drum rotation displaces the pick-up unit along the column assembly in the Y-axis direction.

36 Claims, 6 Drawing Sheets

BIDIRECTIONAL TRANSFER MECHANISM

BACKGROUND OF THE INVENTION

This invention relates generally to mechanical transfer systems and related devices for moving a selected article through a predetermined precision path of motion. More specifically, this invention relates to a relatively simple and relatively lightweight transfer mechanism for displacing a mobile carriage or the like at a relatively rapid speed and with a high degree of reliability and precision. The invention is particularly adapted for use in a video cassette storage and retrieval system wherein the mobile carriage is designed for transferring video cassettes back and forth between a cassette library and cassette playback equipment.

A wide variety of mechanical transfer systems are known in the art for displacing a variety of articles or devices through a preselected path of motion, including movement along or with respect to two or more orthogonal axes. For example, such transfer systems have been used in many industrial applications for moving manufactured articles from one processing station to another. Other types of transfer mechanisms have been used to support a manufacturing tool which is moved through a preprogrammed path for automatic or robotic performance of a manufacturing operation.

In general, however, previous transfer systems having bidirectional capability have experienced a number of disadvantages which have limited their general adoption and use. More specifically, in such transfer systems, inherent mechanical tolerance requirements have presented a significant obstacle to obtaining an output motion with a high degree of positional precision. As a result, when precise motion is desired, such transfer systems have included relatively costly bearing components while other systems have used relatively large and/or heavy structures for supporting moving components, for example, at widely spaced support points. However, these approaches undesirably increase the cost, complexity, size, and overall mass of the transfer system. Moreover, when precision movement is desired, the system components have been limited to relatively slow mechanical displacements due to the mass of the components and/or to avoid undesirable binding of close tolerance or heavy components.

More particularly, in accordance with traditional kinematics theory, mechanical devices constrained for precision movement along a specified axis or direction have required support at a minimum of three rigidly interconnected support points relative to a rigid frame. These support points define a triangular array lying within a plane which ordinarily corresponds with or extends in the direction of movement of the mechanical device. For example, in a mechanical device adapted for precision movement in an X-axis direction, at least three rigidly interconnected support points have been required wherein these support points lie within a common plane extending substantially in the X-axis direction. During X-axis movement of the mechanical device, the trio of support points cooperatively constrain the device against displacement in the Z-axis or Y-axis directions and further against pitch or yaw about the Z-axis or Y-axis. However, these requisite support points necessarily increase the X-axis span or size of the mechanical device with corresponding increases in overall mass, complexity, and cost. Attempts to reduce the X-axis spacing of the support points to reduce the size of the movable device have required expensive bearing structures and close mounting tolerances relative to the rigid frame.

By way of one specific example, video cassette storage and retrieval systems have been proposed for use by television broadcast stations for automated transfer of cassettes between a storage library and playback equipment, thereby permitting automated station operation with selected programs, commercial messages, and the like being played according to a timed, preprogrammed sequence. In such systems, a mobile carriage including a cassette pick-up and release unit is transported by a multidirectional transfer mechanism back and forth between the storage library and the playback equipment to select, transfer, play and return selected cassettes to the library. For proper operation without jamming or cassette misfeeds, the transfer mechanism must be capable of moving the carriage through precise displacements. However, as noted previously herein, precision movements have required relatively slow displacement speeds which are incompatible with the timing demands of a modern broadcast station wherein commercial message spots and the like may be as short as five seconds in duration thereby requiring relatively rapid cassette changeover capability. Moreover, to insure precision movements, previous transfer mechanisms have been relatively large in size to include the requisite mechanical support points, thereby rendering such mechanisms inconvenient for installation into a compact space efficient cassette storage and retrieval system.

There exists, therefore, a significant need for an improved transfer mechanism having bidirectional capability for use, for example, in rapid yet precision transfer of video cassettes and the like between a storage library and associated playback equipment. Moreover, there exists a need for such a transfer mechanism which is relatively simple, compact, and lightweight in construction. The present invention fulfills these needs and provides further related advantages.

SUMMARY OF THE INVENTION

In accordance with the invention, an improved transfer mechanism having bidirectional motion capability is provided for precision displacement of a mobile component. The transfer mechanism is particularly designed, for example, for use in transferring video cassettes or the like rapidly and accurately between a cassette storage library and associated playback equipment.

In general, the transfer mechanism comprises a column assembly constrained for movement in one direction along rigid rail means on a machine frame. A flexible cable and pulley drive means includes cable drive portions connected to the column assembly and operates to translate the column assembly back and forth in said one direction. The rigid rail means and the cable/pulley drive means cooperatively support the column for precision translation substantially without pitch, yaw, or displacement in other directions.

The mobile component is supported on the column assembly for movement therewith in said one direction and for movement along the column assembly for movement therewith in said one direction and for movement along the column assembly in a second direction. Another flexible cable and pulley drive means is coupled to the movable component for independently translating the movable component in said second direction.

In one preferred form of the invention, the transfer mechanism comprises an upright movable column assembly supported at two points on upper and lower rigid rails on the machine frame for back and forth sliding movement generally in an X-axis direction. The column assembly includes a support post extending generally in a Y-axis direction and movably supporting the mobile component, such as a cassette pick-up and release unit for handling video cassettes as part of a video cassette storage and retrieval system associated with video signal playback apparatus. The transfer mechanism is operated by the drive means for simultaneously and/or independently displacing the column assembly along the X-axis and the cassette pick-up unit along the Y-axis, thereby obtaining orthogonal bidirectional output motion of the cassette pick-up unit. Importantly, this output motion may occur rapidly and with a high degree of positional precision.

The drive means comprises a pair of flexible cables having portions wound respectively about a pair of motor-driven winding drums mounted on the machine frame, with the cables being coupled respectively to the components of the transfer mechanism for obtaining the desired X-axis and Y-axis motion. More specifically, a first flexible cable is threaded over a first set of pulleys supported on the machine frame, and arranged to define a plurality of at least three cable drive portions extending in the X-axis direction and connected to the column assembly. The drive portions of the first cable are arranged by said first pulleys to advance in unison in the same, generally X-axis direction upon rotation of the associated winding drum to correspondingly carry the column assembly in the X-axis direction. In the preferred form of the invention, the first cable is connected to the column assembly by securement to outriggers protruding laterally in a Z-axis direction, with at least three and preferably four points of connection located such that the cable drive portions cooperatively apply a resultant displacement force acting generally through a nominal center of mass of the column assembly and cassette pick-up unit thereon. With this arrangement, the pair of rigid rails prevent column assembly displacement in the Y-axis and Z-axis directions while the cable drive portions support the column assembly against pitch or yaw motion respectively about the Z-axis and the Y-axis.

The drive means further includes a second flexible cable threaded over a second set of pulleys on the column assembly and the cassette pick-up unit, with said second cable having opposite free ends anchored on the machine frame. The second pulleys are arranged so that rotation of the associated winding drum respectively in opposite directions results in lifting or lowering of the pick-up unit along the support post in the Y-axis direction. This movement of the pick-up unit occurs independently or simultaneously with respect to X-axis motion of the column assembly.

The transfer mechanism thus provides a relatively simple and lightweight system for obtaining a rapid, precision output motion. In the context of a video cassette storage and retrieval system, the mechanism displaces the cassette pick-up unit to select and grasp a predetermined cassette followed by rapid transfer and insertion of that cassette into appropriate playback equipment, followed in turn by reengagement of the cassette after playback for return to a designated storage location.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
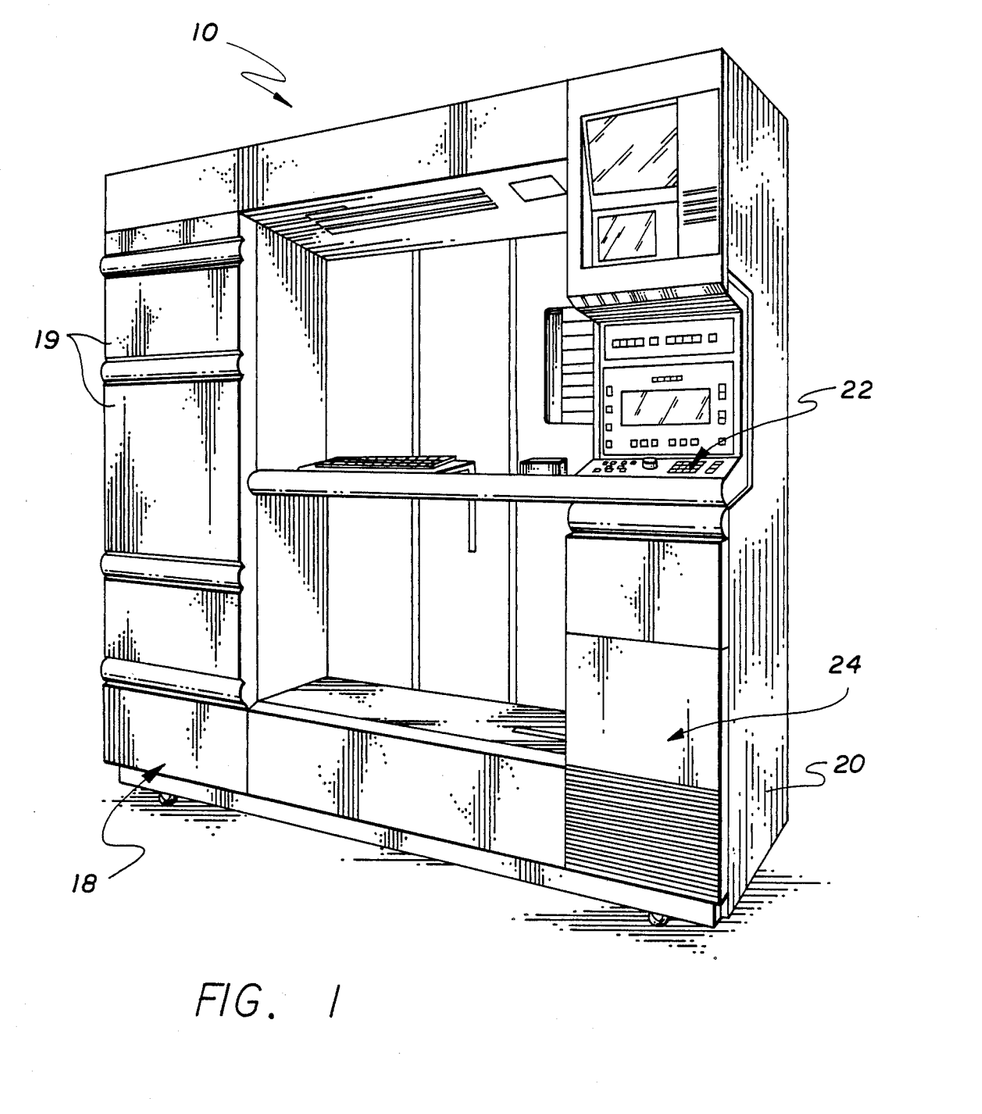
FIG. 1 is a front perspective view illustrating a video cassette storage and playback system including an improved bidirectional transfer mechanism embodying the novel features of the invention.
Figure 2:
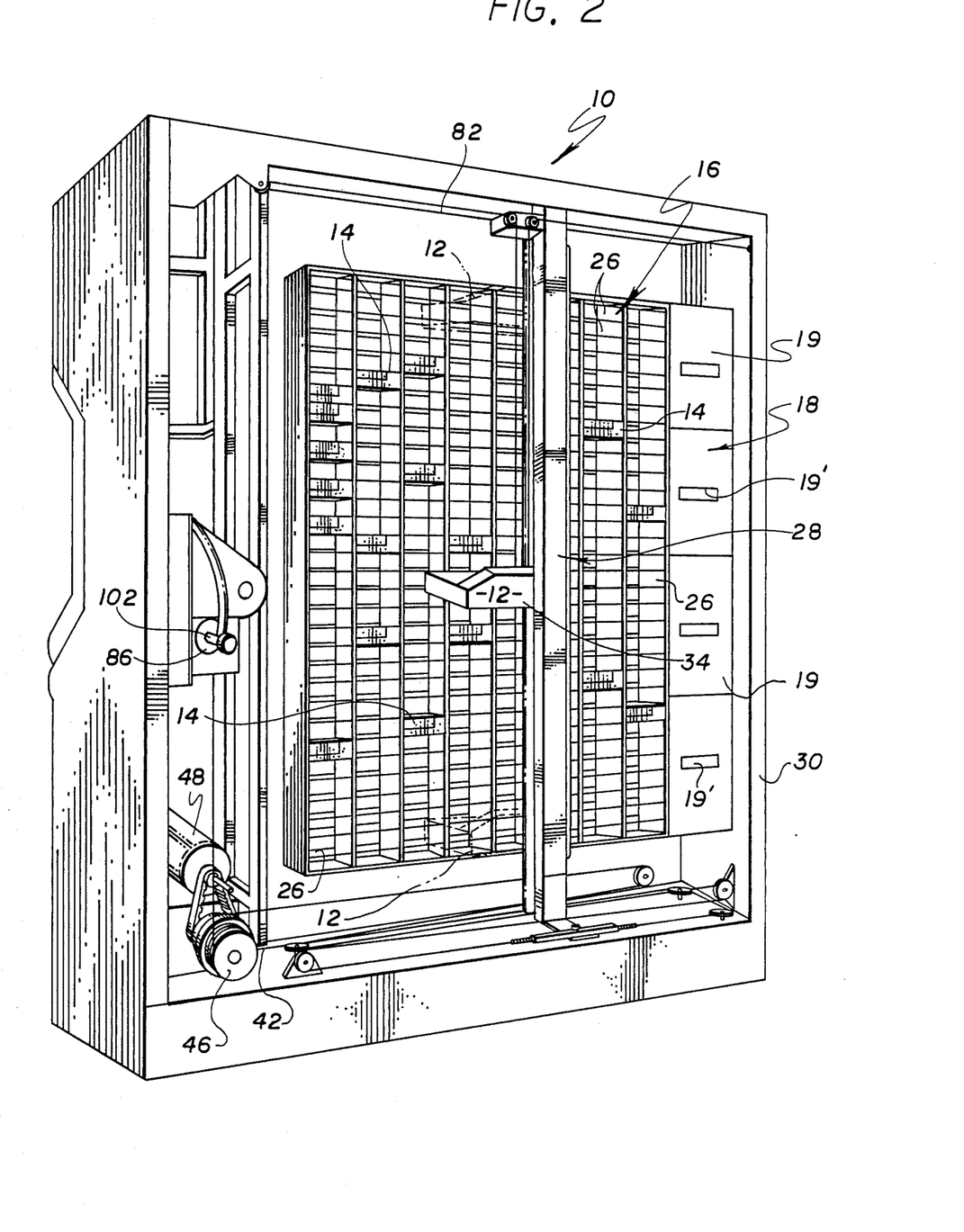
FIG. 2 is a rear perspective view of the system and showing the transfer mechanism included therein.

As shown in the exemplary drawings, a video cassette storage and retrieval system is referred to generally by reference numeral 10 in FIGS. 1 and 2. The cassette storage and retrieval system 10 incorporates a transfer mechanism 12 (FIG. 2) of the present invention for picking up and transferring selected cassettes 14 between a storage library 16 and playback equipment 18. Importantly, the transfer mechanism 12 is designed for achieving rapid cassette transfer speeds with a high degree of mechanical precision and long-term reliability.

The illustrative cassette storage and retrieval system 10 is designed primarily for use by television broadcast stations and the like for automated playback of prerecorded programming including, for example, commercial messages, regular programs, or any other programming recorded on video cassettes 14 stored within the storage library 16. The system 10 comprises an integrated cabinet 20 sized for faciliated shipment to and operation within a typical broadcast station facility. The system includes a front control console 22 and a processing unit 24 for controlling system operations and functions, as will be described in more detail. A plurality of prerecorded cassettes 14 are stored within the library 16 at individually designated locations within rearwardly open bins 26. The transfer mechanism 12 of the present invention is controlled by the processing unit 24 to transfer predetermined cassettes to a selected one of a plurality of playback units 19 included in the playback equipment 18, each of the units 19 includes a rearwardly open chamber 19' (FIG. 2) for receiving the cassettes. After playback of each cassette 14, the processing unit 24 further controls the transfer mechanism 12 to return the cassettes to their respective predetermined bin locations within the storage library Alternatively, it will be understood that the transfer mechanism 12 is not limited for use with the cassette storage and playback system 10 but may be incorporated into a variety of other types of equipment for X-axis and/or Y-axis displacement of a mobile component.

As shown generally in FIGS. 2-5, the transfer mechanism 12 comprises a central column assembly 28 supported by a machine frame 30 at the rear side of the cabinet 20 for back and forth sliding movement generally in the X-axis direction. The column assembly 28 includes an upright support post 32 which carries a cassette pick-up and release carriage or unit 34 for sliding movement up and down along the Y-axis direction, with the unit 34 being depicted in FIG. 2 in solid lines in a central position and in dotted lines in upper and lower positions. The combined ranges of movement of the column assembly 28 along the X-axis and the pick-up unit 34 along the Y-axis are chosen to permit displacements of the pick-up unit throughout the width and height of the storage library 16 and further into association with the playback units 19 (FIG. 2). The pick-up unit 34 includes appropriate means for advancing and retracting generally in a Z-axis direction relative to the support post 32 and for picking up and releasing the cassettes 14 one at a time. However, the detailed construction of the pick-up unit 34 does not form part of the present transfer mechanism invention and thus is not described in further detail here.

Figure 3:
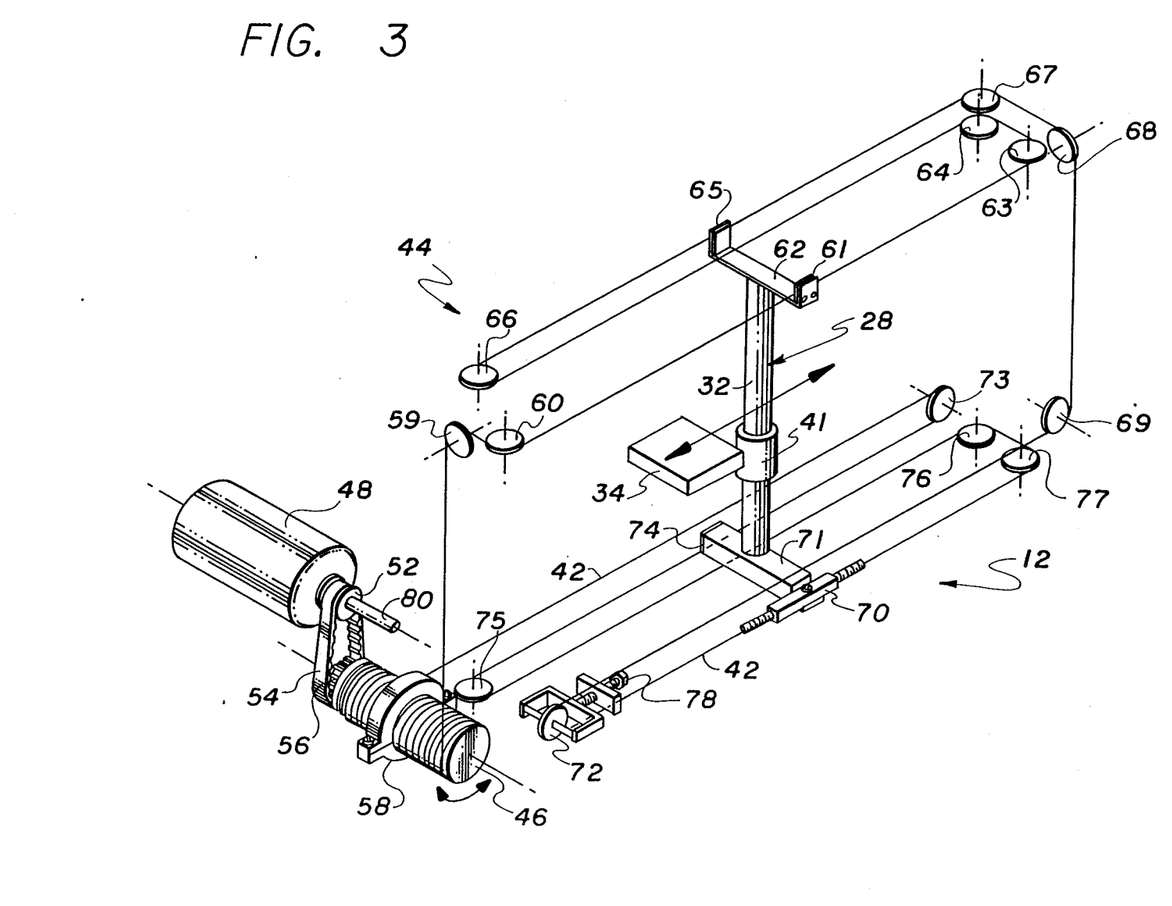
FIG. 3 is a diagrammatic perspective view depicting components of the transfer mechanism for obtaining precision X-axis motion.
Figure 4:
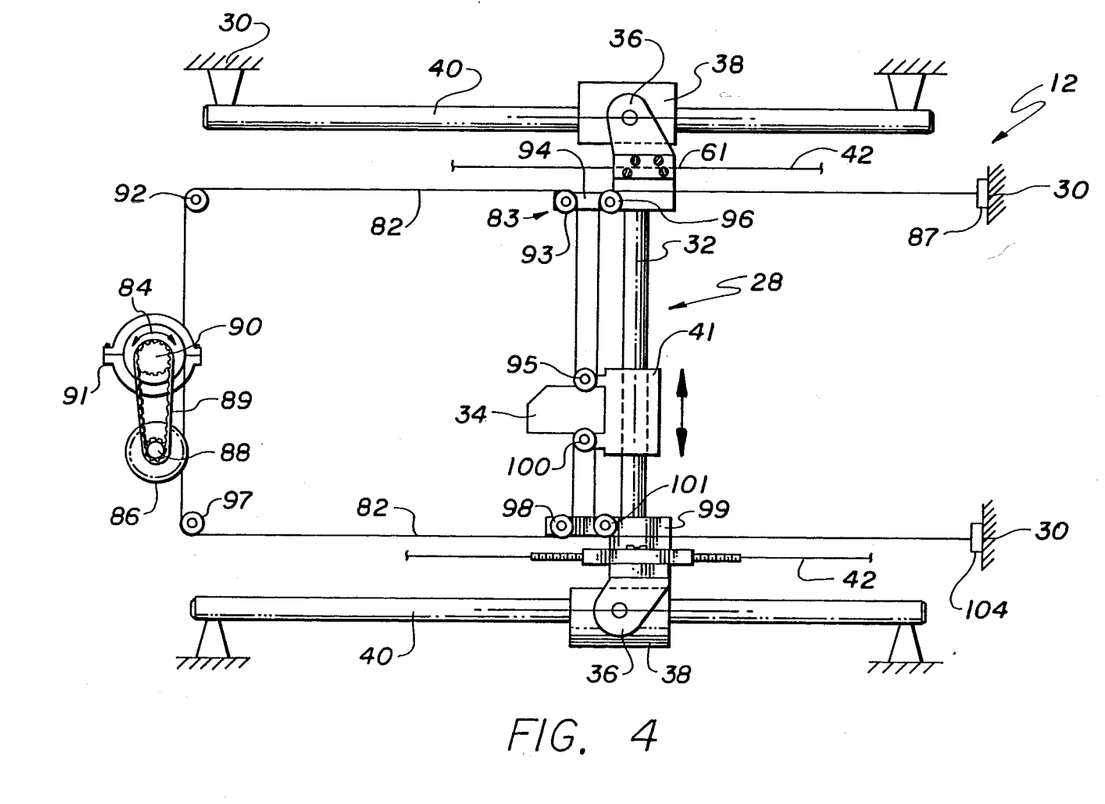
FIG. 4 is a diagrammatic elevation view depicting components of the transfer mechanism for obtaining Y-axis motion.

As shown best in FIGS. 3 and 4, the preferred column assembly 28 includes the upright support post 32 with trunnion blocks 36 at the upper and lower ends thereof. These trunnion blocks 36 are pinned respectively to upper and lower linear bearings 38 which constrain the column assembly for X-axis movement of the column assembly along upper and lower rigid rails 40 of the machine frame. The pick-up and release unit 34 in turn includes a linear bearing block 41 (FIGS. 4 and 5) for slidably guiding the unit 34 vertically in the Y-axis direction along the support post 32. Alternately, other types of column assembly guide and mounting means may be used, if desired.

Separate drive means are provided for displacing the column assembly 28 back and forth in the X-axis direction and for displacing the pick-up and release unit 34 up and down in the Y-axis direction. In accordance with one primary feature of the invention, the separate drive means are adapted for independent operation which may occur sequentially or simultaneously. In this manner, the pick-up unit 34 can be displaced horizontally, vertically, diagonally, or along any other angular path of motion within the general plane of the X-axis and Y-axis directions.

According to another primary aspect of the invention, the X-axis drive means provides the column assembly with an effective third mechanical support to constrain the column assembly for precision X-axis displacement substantially without pitching about a Z-axis or yawing about a Y-axis. Importantly, this X-axis drive means is both simple and lightweight in construction to accommodate rapid, precision X-axis displacement of the column assembly. In turn, the support provided by the X-axis drive means permits the column assembly to assume a minimal profile along the X-axis to correspondingly minimize the overall width of the cassettes storage and retrieval system 10.

As shown best in FIGS. 2-4, the X-axis drive means comprises a single flexible cable 42 of woven wire rope or the like in combination with a set of guide pulleys 44 and a motor-driven winding drum 46 or other suitable reeling device mounted on the machine frame. More particularly, a reversible motor 48 such as a dc torque motor or the like is anchored onto the machine frame and has a rotatable drive shaft carrying a drive gear 52. The output rotation of this drive gear 52 is direct-drive coupled via a cog belt 54 to a driven gear 56 at one end of the winding drum 46. A mid portion of the cable 42 is wrapped spirally for several turns about the winding drum 46, with a central lock collar 58 being conveniently clamped onto the drum to positively prevent cable slippage thereon. Moreover, in a preferred form, the cable 42 is seated within a preformed helical groove in the drum exterior to insure accurate winding and unwinding of the cable during drum rotation.

From the winding drum 46, the opposite ends of the cable 42 extend in threaded relation over the set of pulleys 44 which guide the cable to pass generally in the X-axis direction for securement to the column assembly 28 at least at the upper and lower ends thereof. In particular, as shown in FIG. 3 in the exemplary embodiment of the invention, one end of the cable 42 extends upwardly from the drum 46 and is threaded over a pair of pulleys 59 and 60 generally at the top of the machine frame. These pulleys 59 and 60 function to turn the cable in a direction extending generally in parallel with the X-axis direction and to pass through a cable clamp 61 at one end of a laterally extending outrigger 62 at the top of the support post 32. The cable 42 extends further to an opposite end of the machine frame whereat additional pulleys 63 and 64 turn the cable back in a direction parallel with the X-axis and passing slightly inboard relative to a second cable clamp 65 at the opposite end of the upper outrigger 62. When the cable returns to the first end of the frame above the winding drum 46, another pulley 66 turns the cable back through 180 degrees to extend through the second cable clamp 65 and further to the opposite end of the machine.

Additional guide pulleys 67 and 68 of the pulley set 44 then turn the cable 42 downwardly to a position generally near the bottom of the machine frame. At this location, a pulley 69 turns the cable back along a parallel path to the X-axis to extend slightly above and inboard relative to a turnbuckle 70 secured to one end of a laterally extending outrigger 71 at the lower end of the column assembly 28. A direction-changing pulley 72 located near the winding drum 46 turns the cable back through 180 degrees for connection of one free end of the cable to the turnbuckle 70.

The other end of the cable 42 extends from the winding drum 46 generally in parallel with the X-axis for direction-changing through 180 degrees at the opposite end of the frame by a pulley 73. From this pulley 73, the cable 42 projects through a cable clamp 74 at the opposite end of the lower outrigger 71 and further about a redirecting pulley 75 adjacent the drum 46. The cable then extends back to the opposite frame end where it is turned by an additional pair of pulleys 76 and 77 for redirection back to and connection of the free cable end to the turnbuckle 70.

The foregoing cable and pulley drive arrangement thus provides a closed loop cable with an intermediate portion of the cable wrapped several turns about the winding drum 46. The cable is attached to the top of the column assembly 28 at two laterally spaced points by the cable clamps 61 and 65 and to the bottom of the column assembly at two similarly laterally spaced points by the cable clamp 74 and the turnbuckle 70. In the preferred form, these connection points lie in a common plane along with the column assembly 28 and the upper and lower rails 40. The turnbuckle 70 provides a convenient means for adjusting cable tension, and an adjustment device 78 can be provided for adjusting the position of one pulley, such as the pulley 72, to provide an additional cable tension adjusting means.

Importantly, the portions of the cable 42 secured to the column assembly 28 constitute cable drive portions oriented by the set of pulleys 44 to extend and move in unison along the X-axis and in the same direction with one-to-one displacement when the winding drum 46 is rotated. During such drum rotation, the cable 42 is simultaneously wound and unwound relative to the drum 46 thereby pulling the column assembly 28 along the X-axis. A tachometer 80 on the motor drive shaft detects the magnitude and direction of winding drum rotation and conveniently signals the processing unit 24 with this information to permit precision control and monitoring of X-axis displacement.

The X-axis displacement of the column assembly 28 advantageously occurs smoothly and with a high degree of precision. The cable 42 applies pulling forces to the column assembly at the various laterally spaced positions but cooperating preferably to apply a resultant composite force acting generally through the center of mass of the column assembly. Most preferably, this resultant composite force acts through the combined nonimal center of mass of the column assembly and the pick-up unit 34, although it will be understood that this center of mass will vary to a minor degree as the pick-up unit 34 moves relative to the column assembly. In this manner, the column assembly can be accelerated and decelerated smoothly between stop and relatively rapid speed modes of operation without binding. The rigid rails 40 provide two support points for the column assembly 28 to constrain the column assembly against undesired motion in the Y-axis and Z-axis directions, while the cable 42 and its drive portions cooperate to provide essentially a third support point prevent to pitch and yaw of the column assembly. Although four points of cable connection to the column assembly are shown, in the preferred form different connection points and arrangements may be used, for example, three connection points arranged in a triangular array preferably to apply a resultant displacement force acting through the center of mass of the column assembly. For optimum stability during X-axis, motion, the three or more connection points are desirably spaced from the column assembly generally in the Z-axis direction. Moreover, the use of the cable 42 and its drive portions beneficially permits the span or width of the column assembly 28 to be relatively narrow in the X-axis direction, without requiring extended movable support beams or the like in the X-axis direction, thereby permitting the column assembly to be relatively compact, lightweight, and to achieve substantial Y-axis displacement within a frame of minimal X-axis dimension.

Figure 5:
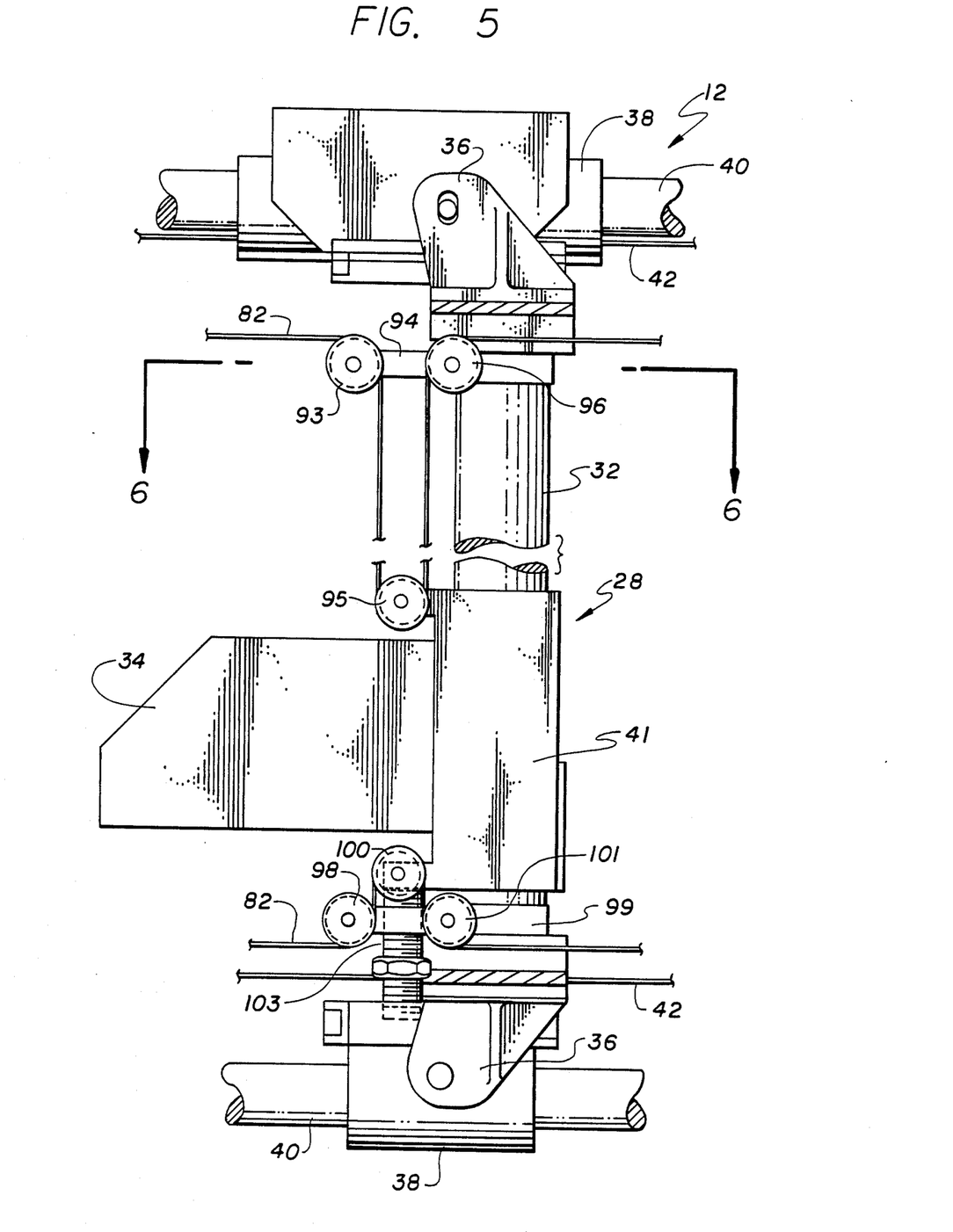
FIG. 5 is an enlarged fragmented elevation view of a portion of the transfer mechanism (FIG. 4) and illustrating further construction details thereof.
Figure 6:
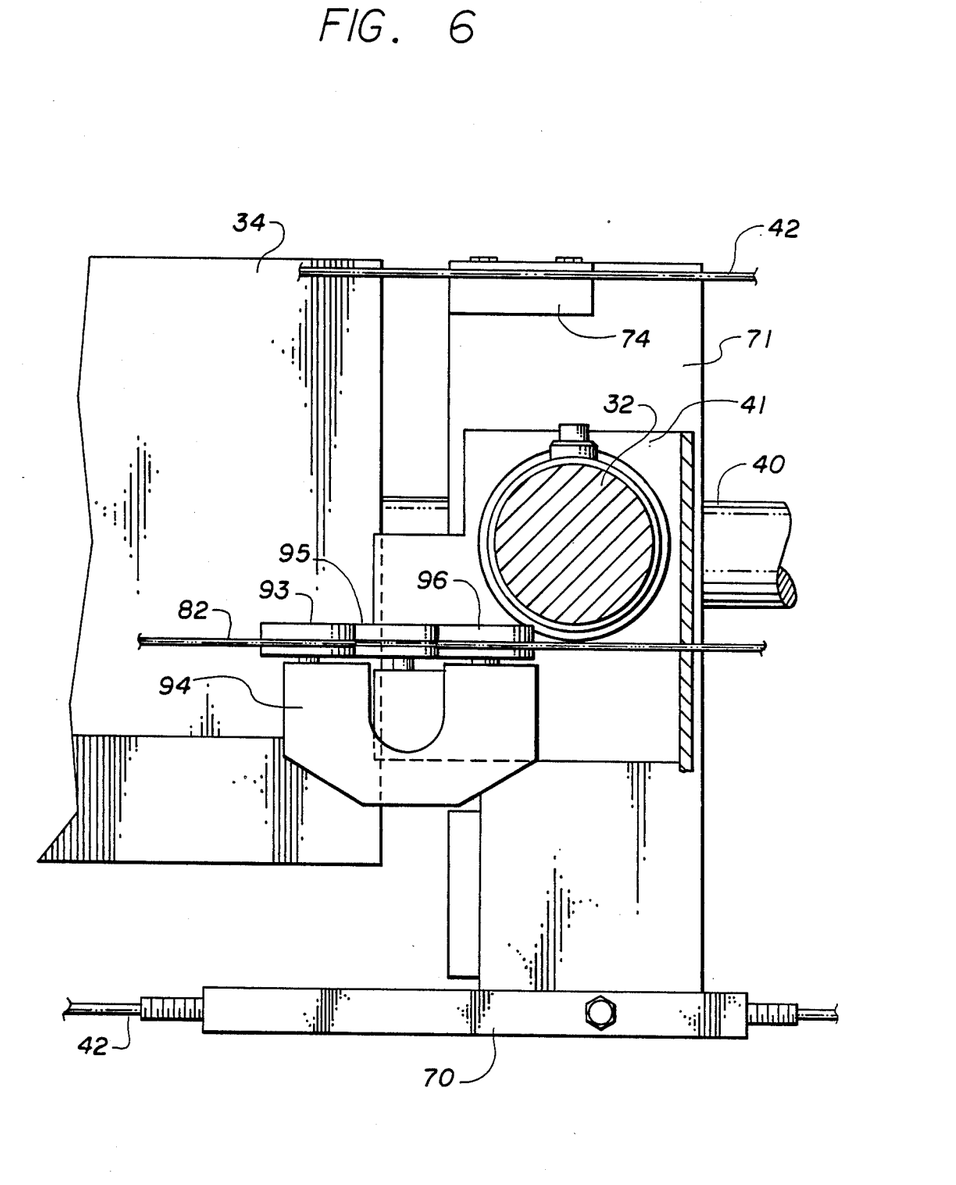
FIG. 6 is an enlarged fragmented horizontal sectional view taken generally on the line 6—6 of FIG. 5.

The Y-axis drive means is shown best in FIGS. 4-6 and also comprises a single flexible cable 82 in combination with a set of pulleys 83 and a motor-driven winding drum 84 or other suitable reeling device mounted on the machine frame. The drum 84 is driven by a reversible drive motor 86 such as a dc torque motor or the like having an output drive shaft carrying a drive gear 88 coupled via a cog belt 89 to a driven gear 90 at one end of the winding drum 84. The second cable 82 is wound several turns onto the winding drum 84, with a lock collar 91 clamped centrally onto the drum to prohibit cable slippage. Moreover, the cable is desirably seated on the drum within a helical groove for accurate tracking during rotation of the drum. From the winding drum 84, the cable 82 extends in opposite directions threaded over the pulley set 83 to control movement of the pick-up unit 34 in the Y-axis direction.

More specifically, one end of the Y-axis cable 82 extends upwardly from the drum 84 generally to the top of the machine frame where it is turned by a guide pulley 92 to extend along the X-axis direction. From the pulley 92, the cable 82 is looped over a turning pulley 93 mounted on a bracket 94 at the upper end of the column assembly 28 and is then threaded beneath a lifting pulley 95 mounted on one side of the bearing block 41 of the pick-up unit 34. The Y-axis cable 82 returns upwardly to pass over another turning pulley 96 on the upper bracket 94 and then resumes extension along the X-axis direction for appropriate connection by a clamp 87 or other suitable fastening means to the machine frame 30, as viewed in FIG. 4.

The other end of the Y-axis cable 82 extends downwardly from the winding drum 84 to a location near the bottom of the machine frame and is turned through about 90 degrees by a guide pulley 97 thereat to extend generally in the X-axis direction. At the column assembly 28, the cable 82 is looped about a turning pulley 98 on a bracket 99 at the lower column assembly end for passage upwardly and for threading over a lowering or retraction pulley 100 mounted on one side of the bearing block 41 generally beneath the lifting pulley 95, as previously described The cable 82 then extends back downwardly to a second turning pulley 101 on the bracket 99 which turns the cable back along the X-axis direction for attachment by a clamp 104 or the like to the machine frame 30 (FIG. 4). The clamps 87 and 104 provide a convenient means for adjusting the tension of the cable 82, although other types of adjustment means can be used. Moreover, a shock absorber device 103 is conveniently provided at the lower end of the column assembly to cushion downward motion of the pick-up unit 34. A similar shock absorber device (not shown) can be provided at the upper end of the column assembly to cushion upward movement at the top of the Y-axis range of motion.

In operation, the Y-axis drive means permits independent operation of the X-axis drive means to displace the column assembly 28 including the pick-up unit 34 in the X-axis direction with or without Y-axis displacement of the pick-up unit 34. More particularly, in the absence of rotation of the Y-axis winding drum 84, the upper and lower sets of the turning pulleys 93, 96 and 98, 101 free-wheel along with the lifting and lowering pulleys 95 and 100 to permit X-axis column assembly displacement without Y-axis movement of the unit 34. However, rotation of the Y-axis winding drum effectively draws in one portion of the cable 82 while feeding off and thus lengthening the other portion of the cable, resulting in lifting or lowering of the pick-up unit 34 in accordance with the direction of drum rotation Importantly, this displacement occurs without requiring the drive motor 86 or the winding drum 84 to move in the X-axis or Y-axis directions with the pick-up unit 34. Y-axis displacement of the pick-up unit 34 is smoothly guided by the support post 32 and may proceed independently of X-axis displacement in the absence of rotation of the X-axis winding drum 46. A tachometer 102 on the Y-axis motor 86 is provided to monitor the magnitude and direction of motor shaft rotation and for providing an appropriate signal to the processing unit 24 for close positional control of Y-axis displacement.

The bidirectional transfer mechanism 10 of the present invention thus provides a relatively simple and lightweight or low inertia arrangement for rapidly moving the pick-up and release unit 34 between the storage library 16 and the playback equipment 18. The unit 34 is displaced according to the programmed operation of the X-axis and Y-axis drive motors to select a particular cassette 14 and to insert that cassette into a particular playback unit 19, followed ultimately by return of the cassette to its designated storage bin. The cable arrangement permits these movements with high precision and, advantageously, with relatively quiet operation. In one working embodiment of the invention including a column assembly supported on upper and lower rigid rails together with four cable drive portion connections as viewed in FIGS. 3 and 4, rapid displacements of the pick-up and release unit between start and stop positions on the order 8–10 feet per second, with accompanying rapid acceleration and deceleration, have been demonstrated successfully without experiencing undesirable binding or twisting of mechanism components and further without sacrificing the requisite degree of mechanical precision.

Moreover, the drive motors and related cable winding drums are advantageously positioned without X-axis or axis displacement at the end of the cable/pulley arrangement to provide the overall transfer mechanism with relatively shallow depth, thereby permitting the transfer mechanism to occupy a relatively compact volumetric space. Still further, the column assembly 28 can have a relatively narrow width profile due to the stability provided by the effective third support point attributable to the X-axis cable drive means to correspondingly enhance the overall compactness of the transfer mechanism. X-axis displacement is therefore smooth and precise, and may be accompanied by Y-axis pick-up unit displacement without mounting the Y-axis drive motor 86 or associated winding drum on the column assembly. The X-axis cable arrangement can be installed and tensioned as desired prior to column assembly installation, after which the column assembly can be installed and/or later removed as a unit without affecting X-axis cable tension or alignment.

A variety of modifications and improvements to the transfer mechanism described herein are believed to be apparent to those skilled in the art. For example, the X-axis and Y-axis cables and related pulley sets may assume alternative configurations, although the embodiment shown and described is preferred since it permits substantially unobstructed full-range X-axis and Y-axis motion and further does not interfere with operation of the pick-up and release unit 34. Accordingly, no limitation is intended by the description or drawings, except as set forth in the appended claims.

What is claimed is:

1. A bidirectional transfer mechanism for X-axis and Y-axis displacement of a mobile component, comprising:
   a frame;
   a column assembly supported on said frame for displacement in an X-axis direction;
   means for supporting the mobile component on said column assembly for Y-axis displacement;
   a first drive cable formed into a closed loop;
   a first rotatable winding drum mounted on said frame and having a portion of said first drive cable wound thereabout;
   a first set of pulleys on said frame and having said first drive cable threaded thereover, said first drive cable being arranged by said first pulleys to have drive portions extending generally in the X-axis direction and generally adjacent opposite ends of said column assembly, said portions being displaced together in the same X-axis direction upon rotation of said first drum in one rotational direction;
   a first stabilizing member provided at a lower end of the column assembly with end portions that extend laterally to either side which to engage and secure the lower end of said column assembly to said first cable drive portions, and a second stabilizing member provided at an upper end of the column assembly with end portions that extend laterally to either side which engage and secure the upper end of said column assembly to said first cable drive portions, whereby rotation of said first drum displaces said first cable drive portions and said column assembly in the X-axis direction;
   a second drive cable having opposite free ends secured to said frame;
   a second rotatable winding drum mounted on said frame and having an intermediate portion of said second drive cable wound thereabout;
   a second set of pulleys on said column assembly and the mobile component and having said second drive cable threaded thereover, said second drive cable being arranged by said second pulleys to displace the mobile component along the Y-axis in opposite directions upon rotation of said second drum respectively in opposite rotational directions; and
   means for controllably and reversibly rotating said first and second drums, said drive portions of said first drive cable being secured to said first and second stabilizing members of said column assembly at a plurality of points positioned on said member and displaced outwardly form the column assembly to stabilize the column assembly and to permit the resultant X-axis displacement force applied to said column assembly through said members to act generally through the nominal center of mass of said column assembly.

2. The bidirectional transfer mechanism of claim 1 further including means for supporting said column assembly for X-axis displacement relative to said frame, said column assembly support means comprising a pair of generally parallel rigid rails on said frame to extend generally in the X-axis direction, and a pair of linear bearings on said column assembly for respective sliding movement along said rails.

3. The bidirectional transfer mechanism of claim 2 wherein said rails are positioned generally at opposite ends of said column assembly.

4. The bidirectional transfer mechanism of claim 1 wherein said mobile component support means comprises a support post on said column assembly extending generally in the Y-axis direction, and bearing means slidably mounted on said support post and carrying the mobile component.

5. The bidirectional transfer mechanism of claim 1 further including means for adjusting the tension of said first drive cable.

6. The bidirectional transfer mechanism of claim 1 further including means for adjusting the tension of said second drive cable.

7. The bidirectional transfer mechanism of claim 1 further including means for monitoring the directions and magnitudes of rotational movement of said first and second winding drums.

8. The bidirectional transfer mechanism of claim 1 wherein said rotating means for said first and second winding drums are selectively operable independently and simultaneously.

9. The bidirectional transfer mechanism of claim 8 wherein said rotating means comprises a pair of drive motors mounted on said frame and respectively coupled to said first and second winding drums.

10. The bidirectional transfer mechanism of claim 9 further including means for controlling the operation of said first and second drive motors.

11. The bidirectional transfer mechanism of claim 1 wherein said first and second drive cables are wound several turns respectively about said first and second winding drums.

12. The bidirectional transfer mechanism of claim 11 further including a pair of lock collar means clamped respectively about said first and second winding drums to prevent slippage of said first and second drive cables.

13. The bidirectional transfer mechanism of claim 11 wherein said first and second winding drums include helical grooves therein for second and guided reception of said first and second drive cables, respectively.

14. The bidirectional transfer mechanisms of claim 1 wherein said first drive cable includes a pair of drive portions coupled generally to the opposite ends of a laterally extending outrigger generally at one end of said column assembly, said outrigger extending out of a plane defined by the X-axis and Y-axis directions.

15. The bidirectional transfer mechanism of claim 1 wherein said column assembly includes a pair of outriggers extending generally in a Z-axis direction from the opposite ends thereof, said first drive cable including a plurality of at least four drive portions coupled respectively to the ends of said outriggers.

16. The bidirectional transfer mechanism of claim 15 wherein said cable securing means comprises cable clamps at three of the ends of said outriggers, and a turnbuckle at the fourth end of said outriggers.

17. The bidirectional transfer mechanism of claim 1 wherein said first and second winding drums are mounted on said frame generally at the end of the range of displacement of said column assembly in the X-axis direction.

18. The bidirectional transfer mechanism of claim 1 wherein said second pulleys are arranged to orient said second drive cables with first and second cable portions extending from said second winding drum generally in the X-axis direction adjacent the opposite ends of said column assembly, said second pulleys including turning pulleys at the opposite ends of said column assembly over which intermediate regions of said first and second cable portions are looped to extend respectively in the Y-axis direction for threading respectively over lifting and lowering pulleys on the mobile component, said first and second cable portions being respectively increased and decreased in length upon rotation of said second drum and in accordance with the direction of second drum rotation to displace the mobile component in the Y-axis direction.

19. The bidirectional transfer mechanism of claim 1 including a cassette storage library disposed generally adjacent said column assembly and defined by an array of cassette storage bins, and cassette playback equipment disposed generally alongside said storage library and including at least one cassette playback unit, the mobile component comprising a cassette pick-up and release unit for transferring selected cassettes between said storage library and said playback equipment.

20. A bidirectional transfer mechanism for displacement of a mobile component, comprising:
 a frame;
 column means supported on said frame for displacement in an X-axis direction, the mobile component being supported on said column means for displacement in the Y-axis direction;
 first drive cable means comprising a single cable with at least three drive portions;
 first pulley means for arranging said first derive cable means to have a plurality of drive portions extending generally in the X-axis direction and generallly adjacent opposite ends of said column assembly, said drive portions being secured to said column assembly at a plurality of points at least two of said points displaced laterally to either side of said column assembly at least one of said upper and lower ends thereof has and at least one of said points displaced outwardly from said column assembly at the other of said ends;
 means for displacing said drive portions in unison and in the same direction generally along the X-axis for carrying said column assembly in the X-axis direction the plurality of points positioned laterally to either side of the column assembly combining with the other said point to stabilize said column assembly and to permit the resultant displacement force in the X-axis direction applied to said column assembly to act generally through the nominal center of mass of said column assembly;
 second drive cable means coupled to the mobile component, and
 means for displacing said second drive cable means to move the mobile component in the Y-axis direction.

21. The bidirectional transfer mechanism of claim 20 wherein said means for displacing said second cable drive means is mounted on said frame and constrained against X-axis and Y-axis displacement.

22. The bidirectional transfer mechanism of claim 20 wherein said first cable displacing means is reversible, and wherein said second cable displacing means is reversible.

23. The bidirectional transfer mechanism of claim 20 wherein said first cable means comprises a single cable with at least three drive portions.

24. The bidirectional transfer mechanism of claim 23 wherein said column assembly includes a pair of outriggers extending generally in a Z-axis direction from the opposite ends thereof, said first drive cable including a plurality of at least four drive portions coupled respectively to the ends of said outriggers.

25. The bidirectional transfer mechanism of claim 20 wherein said first and second cable displacing means are selectively operable independently and simultaneously.

26. The bidirectional transfer mechanism of claim 20 wherein said first and second cable displacing means comprises a pair of winding drums mounted on said frame generally at the end of the range of displacement of said column assembly in the X-axis direction.

27. The bidirectional transfer mechanism of claim 20 further including a cassette storage library disposed generally adjacent said column assembly and defined by an array of cassette storage bins, and cassette playback equipment disposed generally alongside said storage library and including at least one cassette playback unit, the mobile component comprising a cassette pick-up and release unit for transferring selected cassettes between said storage library and said playback equipment.

28. The bidirectional transfer mechanism of claim 20 further including means for supporting said column assembly for X-axis displacement along a pair of rigid and generally parallel rails of said frame, said rails being positioned generally at opposite ends of said column assembly.

29. A transfer mechanism for displacement of a mobile component, comprising:
   a frame;
   flexible drive cable means including at least three drive portions;
   at least one stabiilizing member with end portions that extend laterally to either side of said mobile component at a lower end thereof and at least one stabilizing member with end portions that extend laterally to either side of said mobile component at an upper end thereof, said end portion of said stabilizing members engaging said drive cable means to enable movement of said mobile component generally along a selected axis relative to said frame;
   means for arranging said drive cable means to have a plurality of drive portions extending generally in parallel with said selected axis, each of said drive portions being secured to a respective stabilizing member of the mobile component at a respective plurality of points displaced from the mobile component, to stabilize said mobile component and to permit a resultant force applied thereto to act generally through the nominal center of mass thereof; and
   reeling means associated with each of said drive portions for displacing said cable drive portions in unison and in the same direction generally along said selected axis to displace the mobile component along said selected axis.

30. The transfer mechanism of claim 29 wherein said drive cable means comprises a single cable.

31. The transfer mechanism of claim 29 wherein said drive cable means is formed into a closed loop.

32. The transfer mechanism of claim 29 wherein said support means comprises a pair of generally parallel and rigid raise on the frame, the mobile component including bearing means for sliding motion along aid rails.

33. A bidirectional transfer mechanism for X-axis and y-axis displacement of a mobile, component, comprising:
   a frame having a pair of rails extending generally in the X-axis direction;
   a relative narrow profile column assembly having bearing means for sliding support relative to said rails to permit column assembly displacement in the X-axis direction, said column assembly further including a support post extending generally in the Y-axis direction and bearing means for slidably supporting the mobile component from said support post for displacement in the Y-axis direction;
   said column assembly further including a pair of outriggers at the opposite ends thereof extending generally in the Z-axis direction each outrigger having opposite ends displaced from the column assembly;
   a first drive cable formed into a closed loop;
   a first winding drum having a portion of said first cable wound thereabout;
   a first set of pulleys on said frame and having said first cable threaded thereover, said first cable being arranged by aid pulleys to include four drive portions each extending generally in the X-axis direction adjacent a respective one of the ends of said outriggers and said drive portions being translated in unison along said X-axis and in the same direction upon rotation of said first winding drum;
   means for connecting said first cable drive portions respectively to all said displaced ends of said outriggers to stabilize the column assembly and to drive said column assembly through the nominal center of mass thereof;
   a second drive cable having opposite free ends coupled to said frame;
   a second winding drum mounted on said frame and having an intermediate portion of said second cable wound thereabout;
   said second cable having first and second portions extending from said second drum generally along the X-axis direction adjacent opposite ends of said column assembly;
   a second set of pulleys on said column assembly and the mobile components and having said second cable threaded thereover, said second pulleys including turning pulleys at the opposite ends of said column assembly over which intermediate regions of said first and second cable portions are looped to extend respectively in the Y-axis direction for threading respectively over lifting and lowering pulleys on the mobile component, said first and second cable portions being respectively increased and decreased in length upon rotation of said second drum and in accordance with the direction of second drum rotation to displace the mobile component in the Y-axis direction; and
   means for rotatably driving said first and second drums selectively independently and simultaneously 34. The bidirectional transfer mechanism of claim 33 further including a cassette storage library disposed generally adjacent said column assembly and defined by an array of cassette storage bins, and cassette playback equipment disposed generally alongside said storage library and including at least one cassette playback unit, the mobile component comprising a cassette pick-up and release unit for transferring selected cassette between said storage library and said playback equipment.

35. The bidirectional transfer mechanisms of claim 33 wherein said first and second winding drums are mounted on said frame generally at the end of the range of displacement of said column assembly in the X-axis direction.

36. In a cassette storage and playback system having a cassette storage library with a plurality of prerecorded cassettes stored within individual designated bins and playback equipment including at least one playback unit, a method of transferring cassettes back and forth between the library and the playback equipment, comprising the steps of:

mounting a cassette pick-up and release unit on a generally upright support post for sliding movement along the support port generally in a y-axis direction;

mounting the support post on a machine frame for sliding movement generally in an X-axis direction;

threading a first drive cable including at least three drive portions, the drive cable engaging at least upper and lower stabilizing members provided on the support post at least one of said stabilizing members having end portions which extend laterally to either side which respectively connect to the drive cable at a point spaced from said support post, with the other member connected to the drive cable at at least one point spaced form said support post, thereby to stabilize the support post and to permit a resultant X-axis displacement force to act upon the support post generally through the center of mass thereof;

applying the drive force through a first set of pulleys to include a plurality of drive portions extending generally in X-axis direction adjacent opposite ends of the support post and connecting said drive portions to the stabilizing members provided on said support post;

wrapping a portion of the first cable about a first winding drum;

rotating the first winding drum to displace the cable drive portions in unison and in the same direction along the X-axis to displace the support post in the X-axis direction;

threading a second drive cable over a second set of pulleys mounted on the support post and the pick-up unit and having free cable ends secured to the frame;

wrapping a portion of the second drive cable about a second winding drum; and rotating the second winding drum to displace the second drive cable for displacing the pick-up unit in the Y-axis direction.

* * * * *